United States Patent
Serton

(10) Patent No.: US 11,803,686 B2
(45) Date of Patent: Oct. 31, 2023

(54) SELECTIVE EXPOSURE OF STANDARD CELL OUTPUT NETS FOR IMPROVED ROUTING SOLUTIONS

(71) Applicant: INTERNATIONAL BUSINESS MACHINES CORPORATION, Armonk, NY (US)

(72) Inventor: Richard Edward Serton, Charlottesville, VA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 326 days.

(21) Appl. No.: 17/403,108

(22) Filed: Aug. 16, 2021

(65) Prior Publication Data
US 2023/0047053 A1   Feb. 16, 2023

(51) Int. Cl.
*G06F 30/394* (2020.01)
*G06F 30/392* (2020.01)
*G06F 115/10* (2020.01)

(52) U.S. Cl.
CPC .......... *G06F 30/394* (2020.01); *G06F 30/392* (2020.01); *G06F 2115/10* (2020.01)

(58) Field of Classification Search
CPC .......... G06F 30/30; G06F 30/39; G06F 30/38; G06F 30/394; G06F 30/392; G06F 2115/10
USPC ........................................................ 716/119
See application file for complete search history.

(56) References Cited

U.S. PATENT DOCUMENTS

| | | | |
|---|---|---|---|
| 6,026,223 A * | 2/2000 | Scepanovic | G06F 30/392 716/135 |
| 6,845,494 B2 | 1/2005 | Burks et al. | |
| 6,927,494 B2 | 8/2005 | Allman et al. | |
| 6,946,327 B2 | 9/2005 | Miyamoto et al. | |
| 8,694,945 B2 | 4/2014 | Wang et al. | |
| 2003/0009734 A1 | 1/2003 | Burks et al. | |
| 2003/0186531 A1 | 10/2003 | Allman et al. | |
| 2004/0155351 A1 | 8/2004 | Miyamoto et al. | |
| 2008/0216036 A1* | 9/2008 | Foreman | G06F 30/30 716/113 |
| 2013/0154128 A1 | 6/2013 | Wang et al. | |
| 2020/0328109 A1 | 10/2020 | Boemmels et al. | |
| 2023/0214575 A1* | 7/2023 | Chuang | G06F 30/394 716/104 |

FOREIGN PATENT DOCUMENTS

| | | |
|---|---|---|
| GB | 1426586 A | 3/1976 |
| KR | 1020170015835 A | 2/2017 |

* cited by examiner

*Primary Examiner* — Paul Dinh
(74) *Attorney, Agent, or Firm* — CANTOR COLBURN LLP; Kelsey M. Skodje

(57) ABSTRACT

Provided are embodiments for a computer-implemented method for routing standard cells of an integrated circuit. Embodiments include obtaining a layout of a plurality of standard cells for routing, and determining existing output connections for each of the plurality of standard cells. Embodiments can also include generating a representation for the layout removing the existing output connections for each of the plurality of standard cells; and providing the representation of the layout to an autorouter. Also provided are embodiments for a system and computer program product for routing standard cells of an integrated circuit.

20 Claims, 11 Drawing Sheets

US 11,803,686 B2

SELECTIVE EXPOSURE OF STANDARD CELL OUTPUT NETS FOR IMPROVED ROUTING SOLUTIONS

BACKGROUND

The present invention generally relates to routing networks for integrated circuits, and more specifically, to performing selective exposure of standard cell output nets for improved routing solutions.

In today's environment, integrated circuits can include a large number of transistor devices and circuit components. Routing tools can be used to determine the placement and connections among the plurality of devices and circuit components. The routing tools generate an output design file that can be used to manufacture the integrated circuit. There may be a need to optimize the connections between the devices and circuit components to improve the routing solutions selected by the routing tool.

SUMMARY

Embodiments of the present invention are directed to performing selective exposure of standard cell output nets for improved routing. A non-limiting example computer-implemented method includes obtaining a layout of a plurality of standard cells for routing, and determining existing output connections for each of the plurality of standard cells. The non-limiting example computer-implemented method can also include generating a representation for the layout removing the existing output connections for each of the plurality of standard cells, and providing the representation of the layout to an autorouter.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagrams or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

An electronic circuit is an element that may be used multiple times on an IC. It is typically an element of a technology circuit library. A net represents a connection that must be made between sets of source and sink pins on an IC. A wire is a set of connected conductors which form the connection represented by a net. A wire segment is a contiguous region of a single conducting layer of an IC which is a portion of a wire. A via is a conductor which forms a connection between different conducting layers of an IC, and which is a portion of a wire. A pin or port is a conducting region of a circuit instance to which a wire is connected.

One or more embodiments of the present invention provide an improved routing layout for a plurality of standard cells in a circuit. A routing tool can use the layout of the standard cells to make the connections between the standard cells without regard to the limited real estate.

Figure 1:
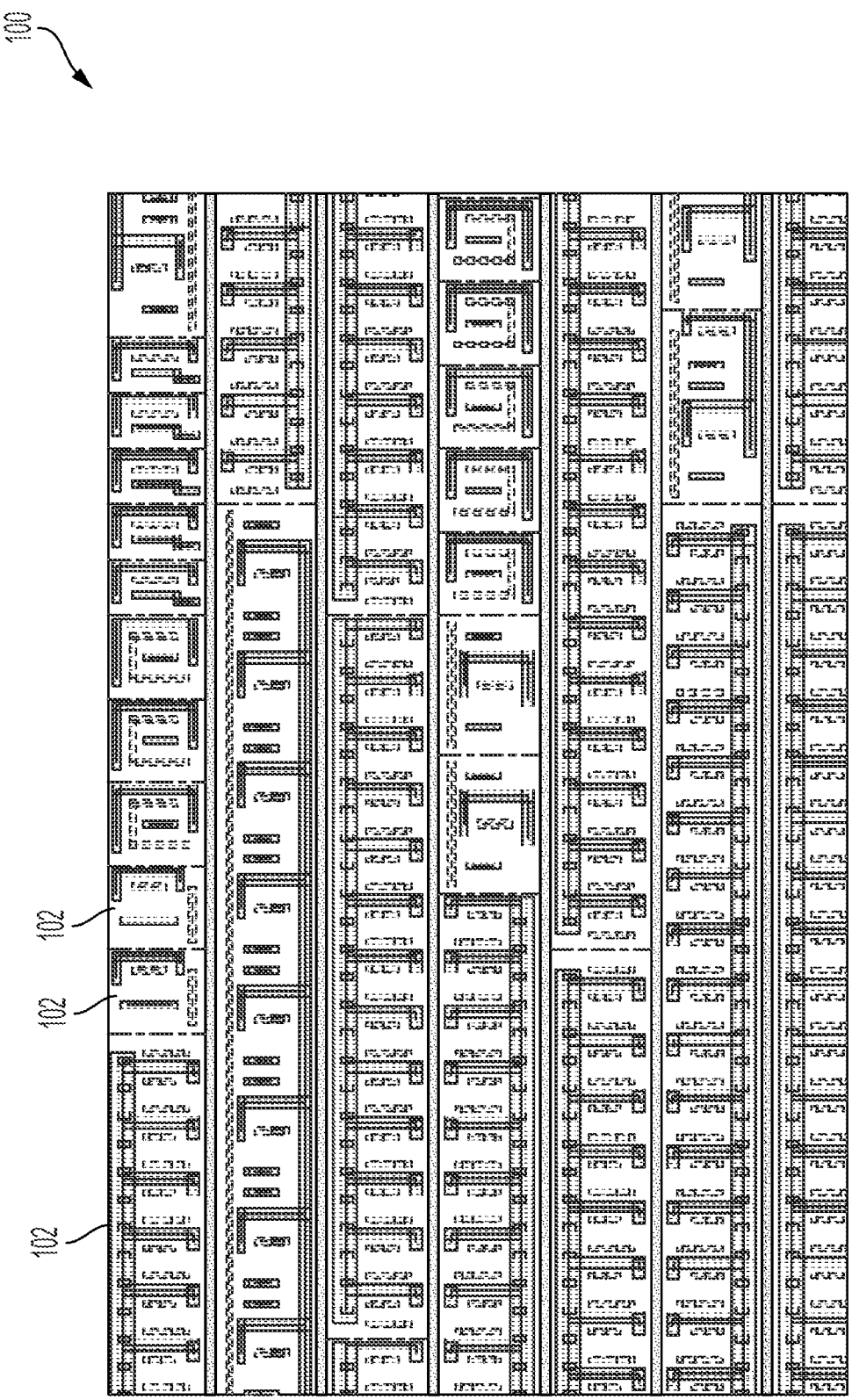
FIG. 1 depicts a top-down perspective view of a layout for an integrated circuit.

FIG. 1 depicts an example layout 100 of an integrated circuit having a plurality of standard cells 102. The standard cells 102 can include AND, OR, inverters, etc. The standard cells 102 can be incorporated into an integrated circuit for performing various functions. The standard cells 102 can also be arranged as combinational logic cells. The standard cells 102 can include inputs and output pins for routing the connections. Power rails can be provided on the integrated circuit for providing power to the one or more cells.

When designing the layout for the integrated circuit, a routing tool, such as an autorouter, to determine the routes for the connections for the standard cells of the integrated circuit. Various tools can be used to place connections in the layout or place the connections among the standard cells. The routing tool can output a netlist upon the determination of all the connections for the layout. The netlist can be provided as a file and characterizes the placement and connection of all components in the circuit board, integrated circuit, or gate array.

Figure 2:
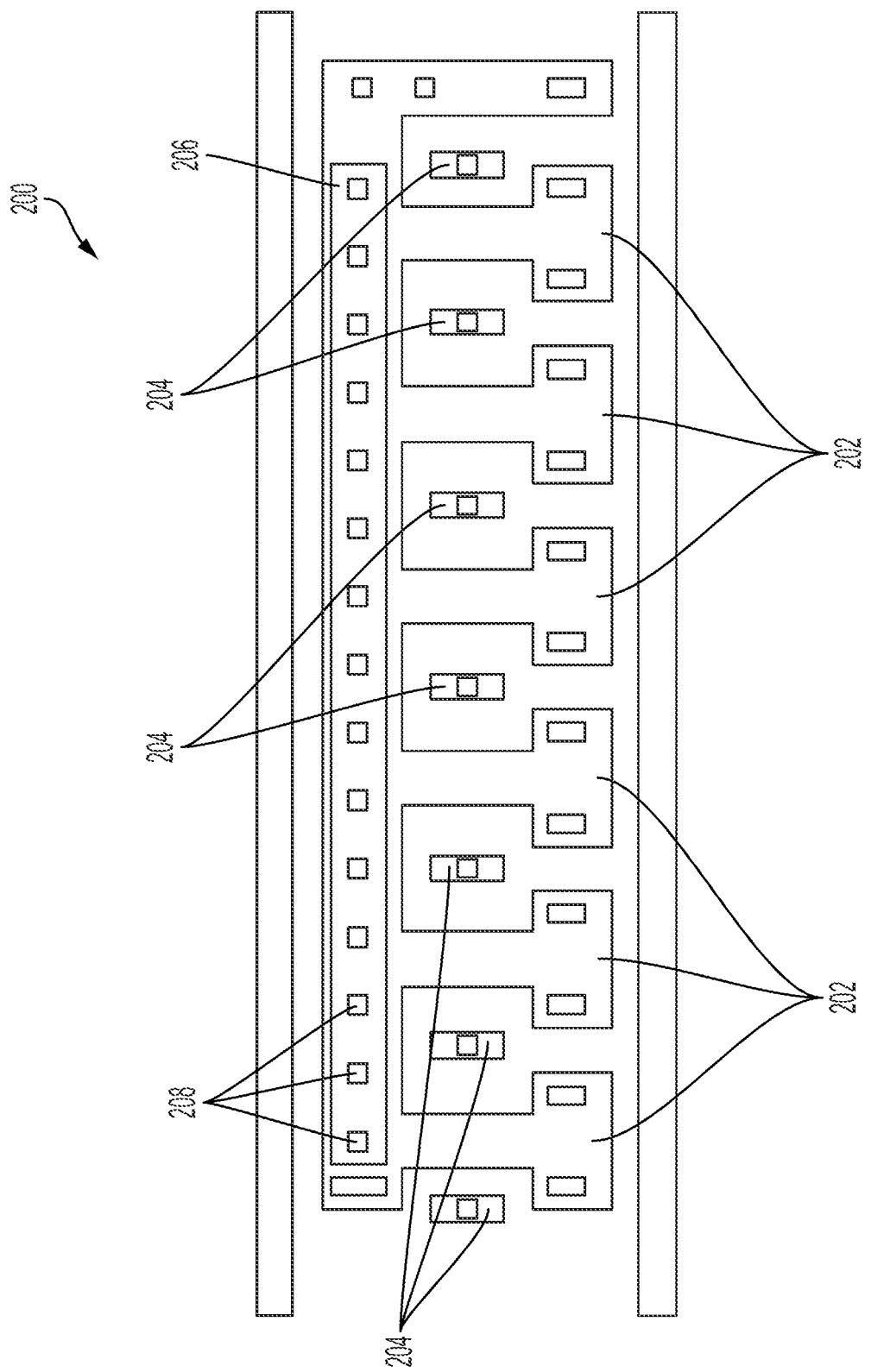
FIG. 2 depicts a top-down perspective view of a conventional standard cell.

FIG. 2 depicts a top-down perspective view of an existing standard cell 200. The standard cell 200 includes a plurality of "I-shaped" formations representing inverters 202 that was formed on a first metal layer. Each of the inverters 202 can be coupled to corresponding inputs 204. FIG. 2 also depicts a metal track 206 that is formed on a second metal layer, where the second layer is formed above the first metal layer. The metal track 206 includes a plurality of pins 208 to make connections to the output connections of the inverters 202. Although only 3 pins are labeled on the metal track 206, it should be understood that each of the formations similar to pins 208 are also pins used for output connections. During fabrication, the output connections of the inverters 202 can be connected to the metal track 206 using vias from the first metal layer to the pins 208 on the second metal layer. As shown, the location of the track 206 for this standard cell 202 is limited to this position of the inverter 202 to make the connections. In the event identical standard cells 200 are positioned adjacent to one another, the metal tracks 206 are will be located on the same horizontal track. That is, each of the same type of components (i.e., AND, OR, NAND, etc.) will have tracks located in the same horizontal position which can require further metal resources by using additional metal and metal layers to complete the routing of the standard cell 200 as discussed with reference to FIG. 3 below. As a result, the layout of the metal track 206 arranges the output connections in a fixed position for the inverters 202 and limits the flexibility of the locations the autorouter can complete the routing of the connections for the standard cell 200.

Figure 3:
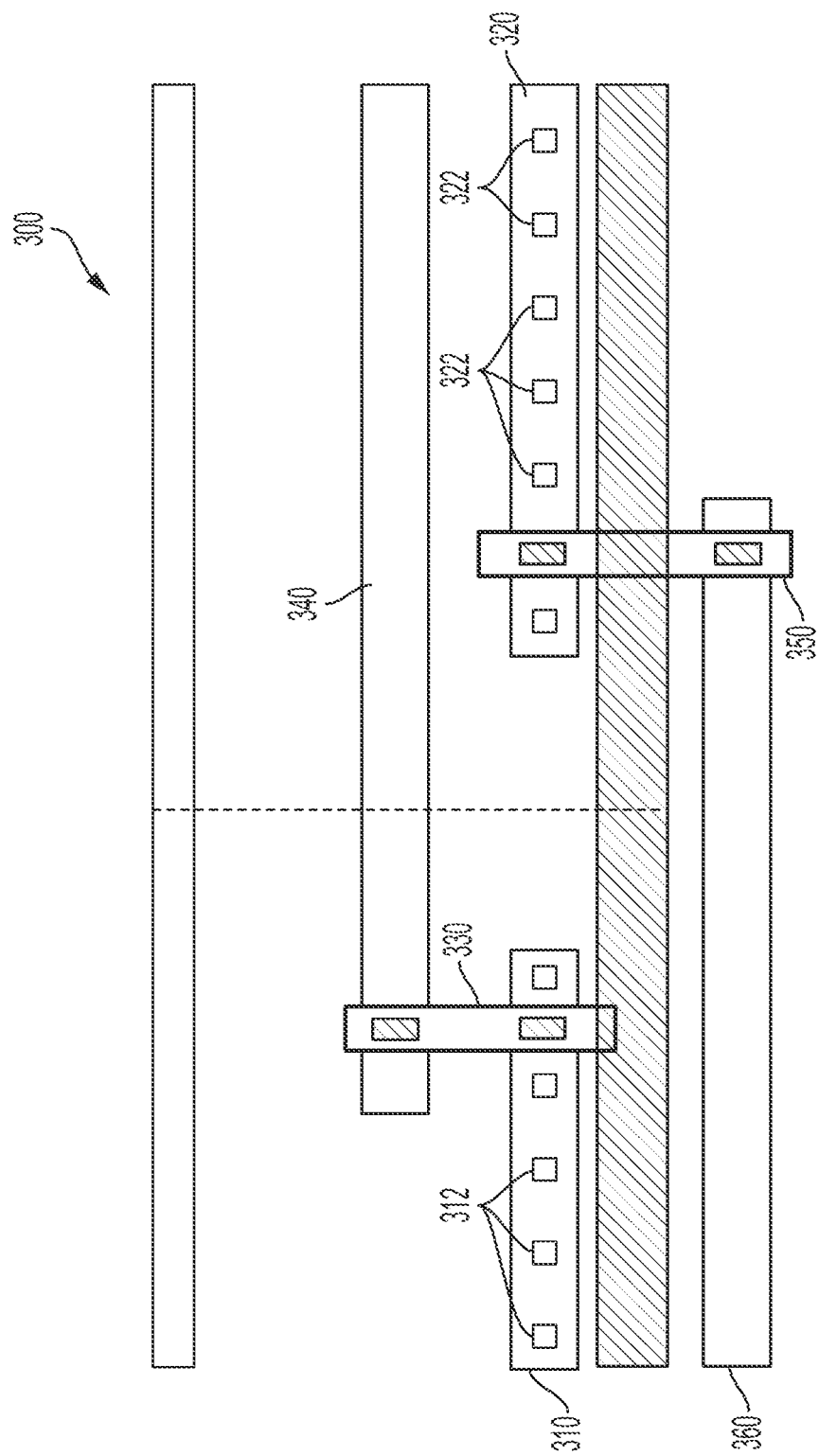
FIG. 3 depicts a top-down perspective view of metal tracks of a conventional standard cell.

FIG. 3 depicts a top-down perspective view of an example where identical cells are positioned adjacent to each other using conventional techniques. In this example, the inverters underlying metal track 310 and metal track 320 for each of the adjacent inverters are not shown. However, given that each inverter is identical and the metal tracks 310, 320 are located on the same horizontal M2 track to connect the output pins of the inverter, the routing flexibility of the router is limited. As shown, where the pins are placed on the same output track of a metal layer. The metal track 310 includes a plurality of available output connections 312 and the metal track 320 also includes a plurality of output connections 322. Because the metal track for each of the inverters is on the same horizontal metal layer track (metal layer 2—M2), therefore, if the identical inverters are positioned adjacent to each other they will be forced to connect to their corresponding output connections on another metal layer.

In the event the first inverter corresponding to the metal track 310 needs to be routed in the direction of the second inverter (right direction), a via must be used to connect to the metal strip 330 to connect to the output track 340. Similarly, if the second inverter corresponding to the metal track 320 needs to be routed in the direction of the first inverter (left direction), a via must be used to connect the metal strip 350 to the output track 360. It can be appreciated that the use of additional vias can lead to imperfections during manufacturing leading to errors in performance or the non-functioning of the circuit. In addition, the use of additional metal in the metal strips 330, 350 wastes unnecessary metal resources increasing the cost and complexity of the circuit and the additional metal can potentially cause more issues in routing in more complex wiring scenarios. As shown in FIG. 3, the existing layout of the standard cells is limited by the metal tracks that are used to connect the output connections of the devices in the cells.

As shown, if the autorouter selects the pins for connection and are placed on the metal layer, the router can be forced to use the specific horizontal M2 track which limits the flexibility of the routing. If several similar components or standard cells are placed in close proximity of each other, then none of them can use the output track exclusively and must via up to another metal layer to complete the routing connections.

The techniques described herein provide for generating a layout for standard cell output pins of an integrated circuit to maximize routing flexibility while ensuring good performance and minimizes electromigration issues. The techniques described herein generate an abstraction for the integrated circuit and provides the abstraction to an autorouter for routing each connection of the fully routed standard cell.

One or more embodiments of the present invention provide technological improvements over current methods of selecting and completing the routing of the standard cells of an integrated circuit. Disadvantages of contemporary approaches may include completing the routing of adjacent identical standard cells over the same horizontal track of a metal layer which limits the flexibility of the autorouter. In order to complete the routing of standard cells of an integrated circuit an autorouter can be used to complete the output connections of the standard cells. It can be beneficial in the integrated circuit to reduce the complexity of the connections and reduce the cost and any unnecessary metal layers in the integrated circuit. Identical standard cells generally use the same track for making connections by the autorouter.

Methods for completing the routing of densely packed identical cells in a layout include using vias to form a connection on a higher metal layer. However, by using vias to form connections on a higher metal layer, additional metal tracks must be used to avoid collisions with the output connections of nearby standard cells. In addition, by using additional vias, an opportunity for the autorouter to miss a connection or form a malformed via during manufacturing can directly impact the operability of the standard cell.

Accordingly, one or more embodiments of the present invention generates an abstraction of a fully routed standard cell which allows the autorouter to flexibly form the connections for the standard cells without being limited to the single horizontal track. One or more embodiments of the present invention provide technical solutions to one or more of these disadvantages of existing solutions by obtaining an abstraction for the layout of a fully routed standard and providing the abstraction to the autorouter where each of the connections in the abstraction are removed.

Figure 4A:
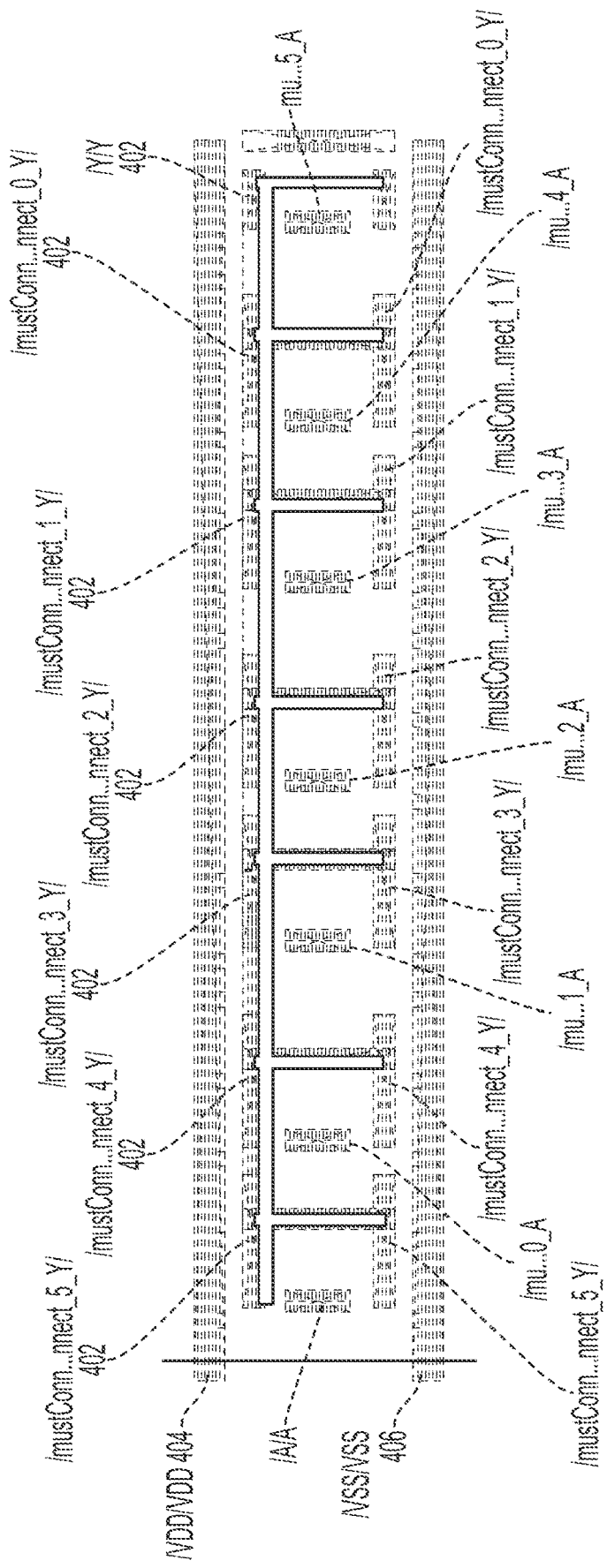
FIGS. 4A and 4B depicts a schematic of a fully connected inverter and an abstraction of a standard cell in accordance with one or more embodiments of the invention.
Figure 4B:
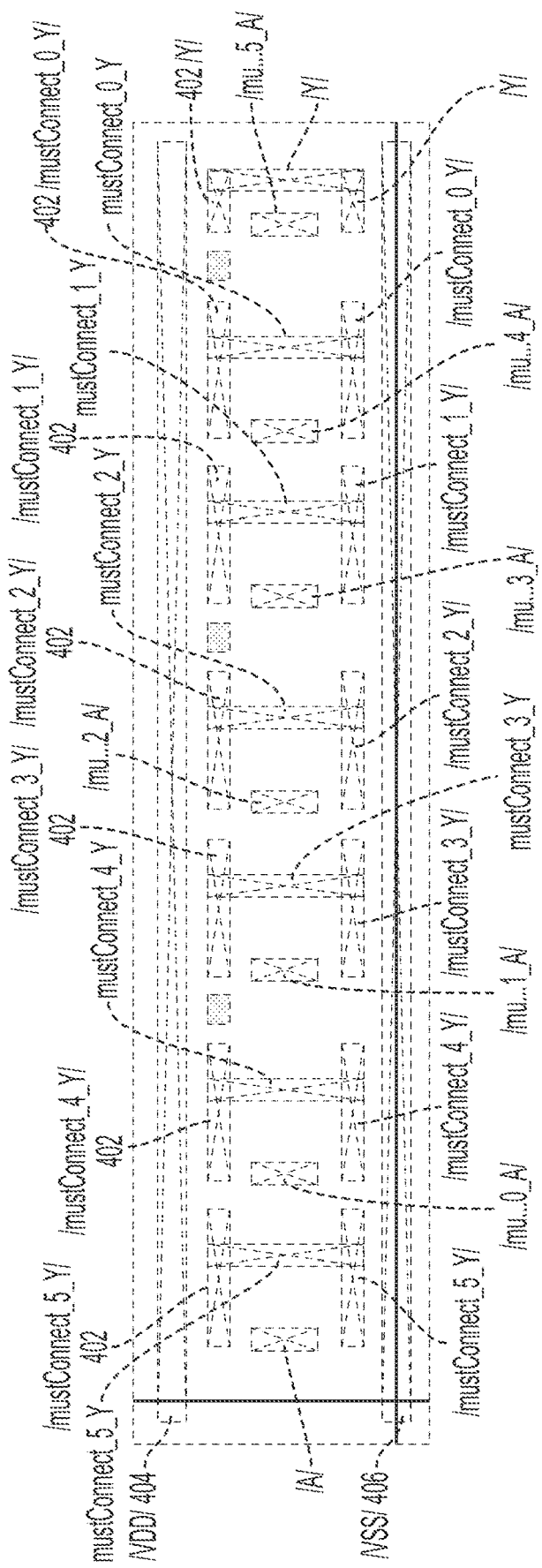

Turning now to FIGS. 4A and 4B, a schematic of the standard cell 400 and abstraction 400 that represents an abstraction used by an auto-router for generating connections is generally shown in accordance with one or more embodiments of the present invention. As shown in FIG. 4A, the standard cell 400 includes a plurality of inverters 402. In addition, FIG. 4A includes a positive power supply 404 and a negative power supply rail 406. As shown in FIG. 4A, the inverters 402 are fully routed output net with pin islands.

In one or more embodiments of the invention, the abstraction shown in FIG. 4B of the standard cell 400 provides a disjointed representation of the standard cell 400. The abstraction shown in FIG. 4B removes each of the connections of the standard cell 400. Therefore, when the representation or abstraction is received at the autorouter, the autorouter will generate an output connection for each of the devices to complete the routing of the standard cell 400. In one or more embodiments of the invention, the abstraction can be provided to the autorouter in a file format that is compatible for the autorouter. Responsive to receiving the abstraction, the autorouter will begin to place each of the connections among the components.

The abstraction provides a disjointed representation of the components of the standard cell. One or more illustrative embodiments of the disclosure are described herein. Such embodiments are merely illustrative of the scope of this disclosure and are not intended to be limiting in any way. Accordingly, variations, modifications, and equivalents of embodiments disclosed herein are also within the scope of this disclosure.

Figure 5:
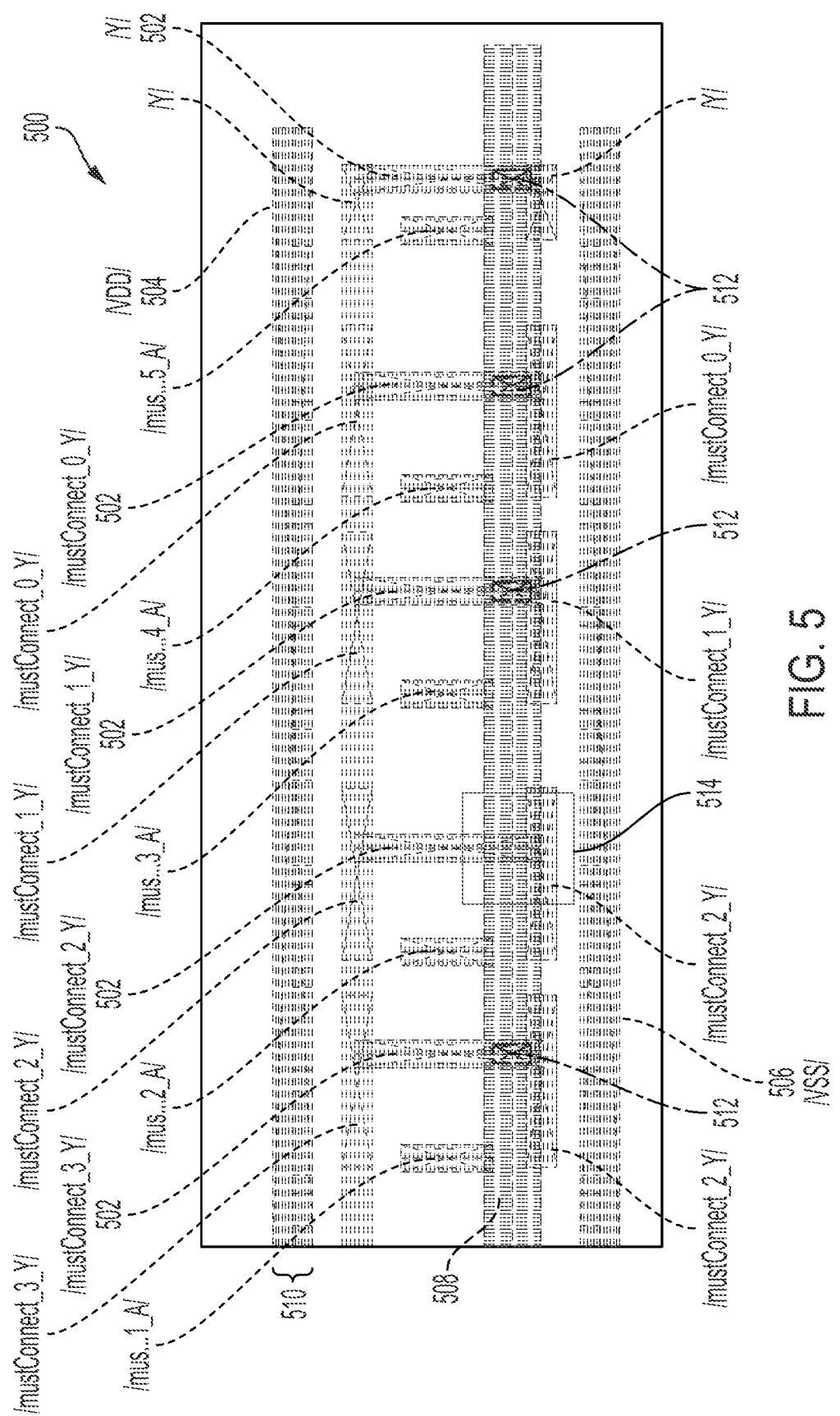
FIG. 5 depicts a schematic of a metal track positioned in accordance with one or more embodiments of the invention.

FIG. 5 depicts a schematic of a standard cell 500 using an improved routing scheme in accordance with one or more embodiments of the invention. The standard cell 500 includes a plurality of "I-shaped" formations representing inverters 502. FIG. 5 also includes a positive power rail 504 and a negative power rail 506. The metal track 508 can be formed over any portion of the inverters 502 and is not limited to the horizontal region 510 unlike the metal track 206 shown in FIG. 2 which is limited to the top portion of the inverters 202. The metal track 508 includes a plurality of pins 512 that can be used to make connections to the inverters 502 by the autorouter.

As shown in FIG. 5, a connection may not have been formed or may have been misformed in the outlined area 514. However, because the inverter of the standard cell remains fully routed, the integrity of the standard cell remains intact. Therefore, the standard cell remains fully functional. By leaving the standard cell fully routed and avoiding the creation of metal islands to connect the output connections for each standard cell, the redundancy of the autorouter generating a connection using the abstraction protects against a missing or malformed via.

One or more illustrative embodiments of the disclosure are described herein. Such embodiments are merely illustrative of the scope of this disclosure and are not intended to be limiting in any way. Accordingly, variations, modifications, and equivalents of embodiments disclosed herein are also within the scope of this disclosure.

Figure 6:
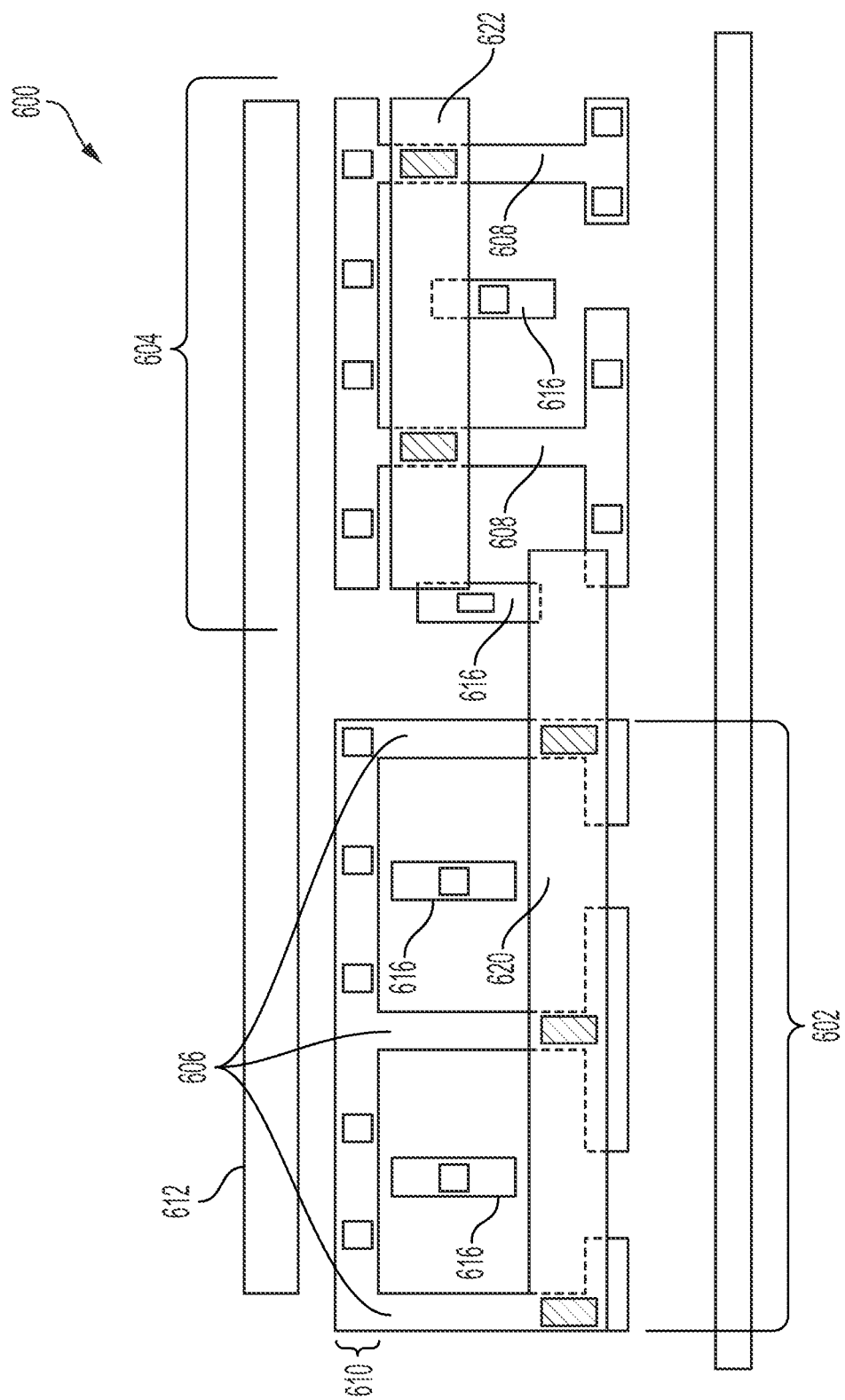
FIG. 6 depicts a schematic of metal tracks for adjacent identical cells that are positioned in accordance with one or more embodiments of the invention.

FIG. 6 depicts a schematic of layout 600 using an improved routing scheme in accordance with one or more embodiments of the invention. The layout 600 includes a first standard cell 602 and a second standard cell 604. The first standard cell 602 includes a plurality inverters 606, and similarly, the second standard cell 604 includes a plurality of inverters 608. The layout 600 includes a positive power rail 612 and a negative power rail 614. Each inverter also includes a plurality of inputs 616. In one or more embodiments of the invention, the layout 600 includes identical inverters 606 and 608 that are positioned adjacent to each one another similar to that shown in FIG. 3. However, as shown in FIG. 6, the autorouter can select the horizontal track for routing the output connections of the standard cells 602 and 602. The metal track 620 of the first standard cell is allowed to be positioned in a different horizontal track than the second standard cell 604. Also, the metal track 622 of the second standard cell 604 is positioned in high higher horizontal track than the metal track 620 of the first standard cell 602. By using the techniques described herein the autorouter maintains the flexibility to select where the metal track 620 and 622 are positioned over the first standard cell 602 and the second standard cell 604 and is not limited to the single horizontal track 630 which is similar to the horizontal track for the metal track 310 and 320 of FIG. 3. This enables the autorouter to select various portions of the standard cells 602, 604 to form the connections. Even in a densely populated area with multiple identical standard cells 602, 604, the autorouter can determine a routing solution with multiple via crops on large driver nets while maintaining the flexibility to user nearly all of the available horizontal wiring resources.

Although the metal tracks are shown on in the first position of the first inverter and the second position of the second inverter the metal track is not limited by the example and is only shown as an example.

In the densely populated area with multiple identical standard cells, optimal routing solutions with multiple via drops on large driver nets are still available allowing for flexibility to use nearly all of the available horizontal wiring resources in the layout.

One or more illustrative embodiments of the disclosure are described herein. Such embodiments are merely illustrative of the scope of this disclosure and are not intended to be limiting in any way. Accordingly, variations, modifications, and equivalents of embodiments disclosed herein are also within the scope of this disclosure.

Figure 7:
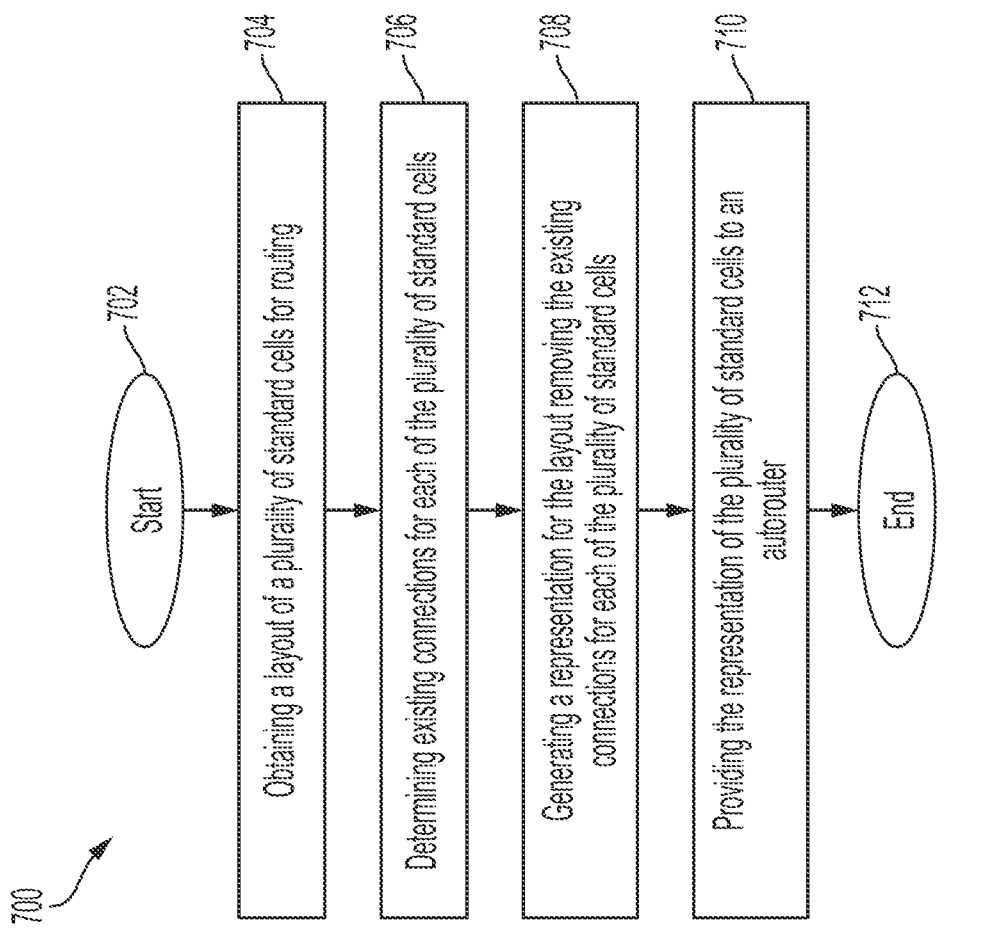
FIG. 7 illustrates a flow diagram of a process for performing selective exposure of standard cell output nets for improved routing solutions in accordance with one or more embodiments of the present invention.

FIG. 7 a flowchart of a method 700 for performing selective exposure of standard cell output nets for improved routing in accordance with one or more embodiments of the disclosure. In one or more embodiments of the invention, the method 700 can be executed in processor or processing system such as that shown with reference to FIG. 8 below. The method 700 begins at block 702 and proceeds to block 704 which provides for obtaining a layout of a plurality of standard cells for routing. Block 706 determines existing connections for each of the plurality of standard cells. Block 708 generates a representation for the layout removing the existing connections for each of the plurality of standard cells. The representation does not include existing connections in the abstractions provided to the autorouter. The autorouter seeing that no connections are made, will perform the task of making the connections of the standard cells. Block 710 provides the representation of the layout to an autorouter. The representation can be provided to the autorouter in the form of a file, such as a netlist where no connections are linked which allows the autorouter to make a determination for the placement of the connections. This enables the flexibility of the autorouter to make routing determinations without having to make unnecessary connections on a different metal layer. The method 700 ends at block 712.

One or more illustrative embodiments of the disclosure are described herein. Such embodiments are merely illustrative of the scope of this disclosure and are not intended to be limiting in any way. Accordingly, variations, modifications, and equivalents of embodiments disclosed herein are also within the scope of this disclosure.

The technical effects and benefits include improved flexibility for a routing tool to place connections to the output cells of the standard cell. Now the router has multiple options to select to connect to the metal 2 track without having to form connections on the single limited track. This technique can result in savings of wiring resources without having to use the additional wiring tracks. The fact that the pin islands of the fully connected router are connected, there is no harm if the via is missing or malformed during manufacturing.

Figure 8:
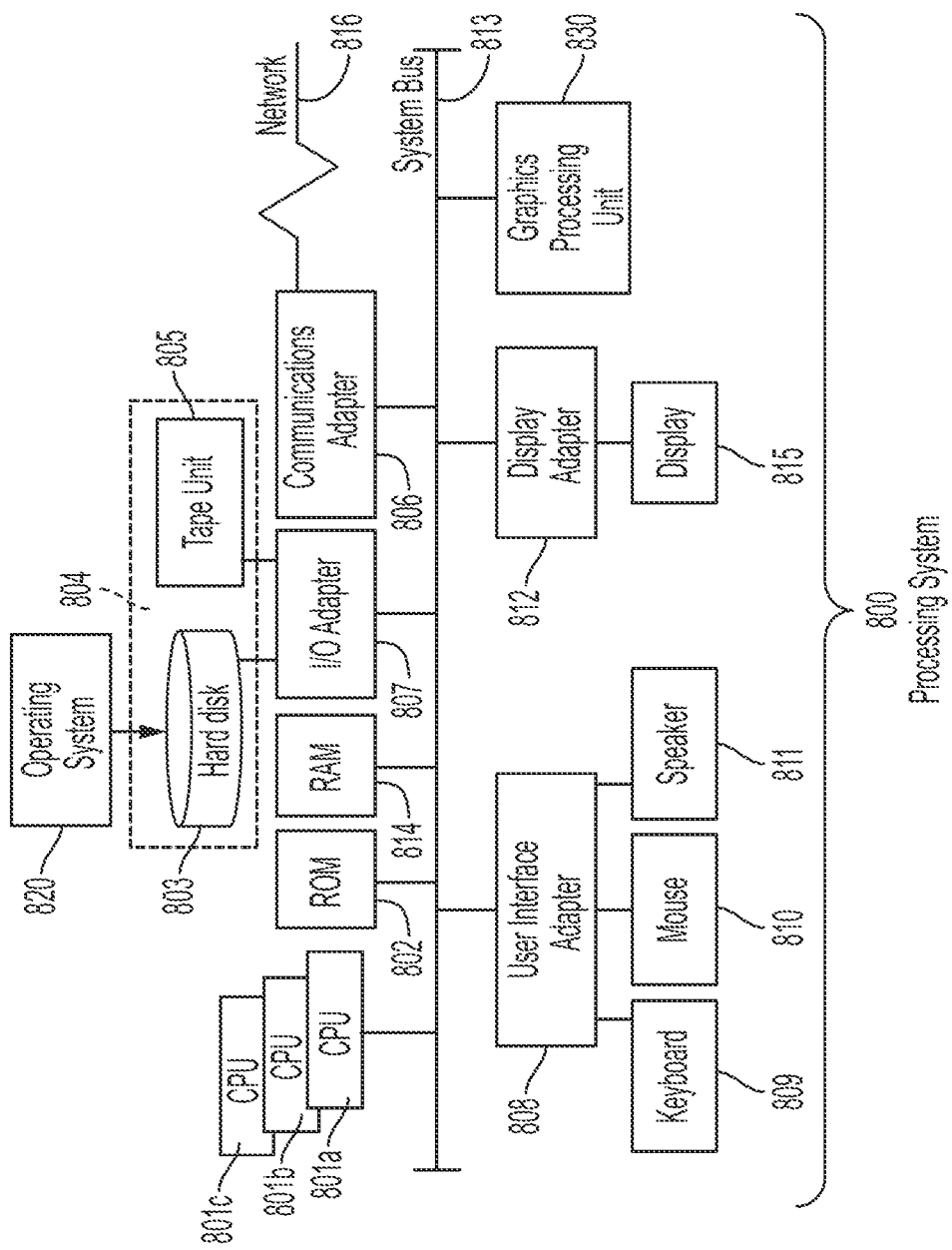
FIG. 8 depicts a generic system for practicing the teachings described herein in accordance with one or more embodiments of the present invention.

Referring to FIG. 8, there is shown an embodiment of a processing system 100 for implementing the teachings herein. In this embodiment, the system 800 has one or more central processing units (processors) 801a, 801b, 801c, etc. (collectively or generically referred to as processor(s) 801). In one embodiment, each processor 801 may include a reduced instruction set computer (RISC) microprocessor. Processors 801 are coupled to system memory 814 and various other components via a system bus 813. Read only memory (ROM) 802 is coupled to the system bus 813 and may include a basic input/output system (BIOS), which controls certain basic functions of system 800.

FIG. 8 further depicts an input/output (I/O) adapter 807 and a network adapter 806 coupled to the system bus 813. I/O adapter 807 may be a small computer system interface (SCSI) adapter that communicates with a hard disk 803 and/or tape storage drive 805 or any other similar component. I/O adapter 807, hard disk 803, and tape storage device 805 are collectively referred to herein as mass storage 804. Operating system 820 for execution on the processing system 800 may be stored in mass storage 804. A network adapter 806 interconnects bus 813 with an outside network 816 enabling data processing system 800 to communicate with other such systems. A screen (e.g., a display monitor) 815 is connected to system bus 813 by display adaptor 812, which may include a graphics adapter to improve the performance of graphics intensive applications and a video controller. In one embodiment, adapters 807, 806, and 812 may be connected to one or more I/O busses that are connected to system bus 813 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 813 via user interface adapter 808 and display adapter 812. A keyboard 809, mouse 810, and speaker 811 all interconnected to bus 813 via user interface adapter 808, which may include, for example, a Super I/O chip integrating multiple device adapters into a single integrated circuit.

In exemplary embodiments, the processing system 800 includes a graphics processing unit 830. Graphics processing unit 830 is a specialized electronic circuit designed to manipulate and alter memory to accelerate the creation of images in a frame buffer intended for output to a display. In general, graphics processing unit 830 is very efficient at manipulating computer graphics and image processing, and has a highly parallel structure that makes it more effective than general-purpose CPUs for algorithms where processing of large blocks of data is done in parallel.

Thus, as configured in FIG. 8, the system 800 includes processing capability in the form of processors 801, storage capability including system memory 814 and mass storage 804, input means such as keyboard 809 and mouse 810, and output capability including speaker 811 and display 815. In one embodiment, a portion of system memory 814 and mass storage 804 collectively store an operating system to coordinate the functions of the various components shown in FIG. 8.

Figure 9:
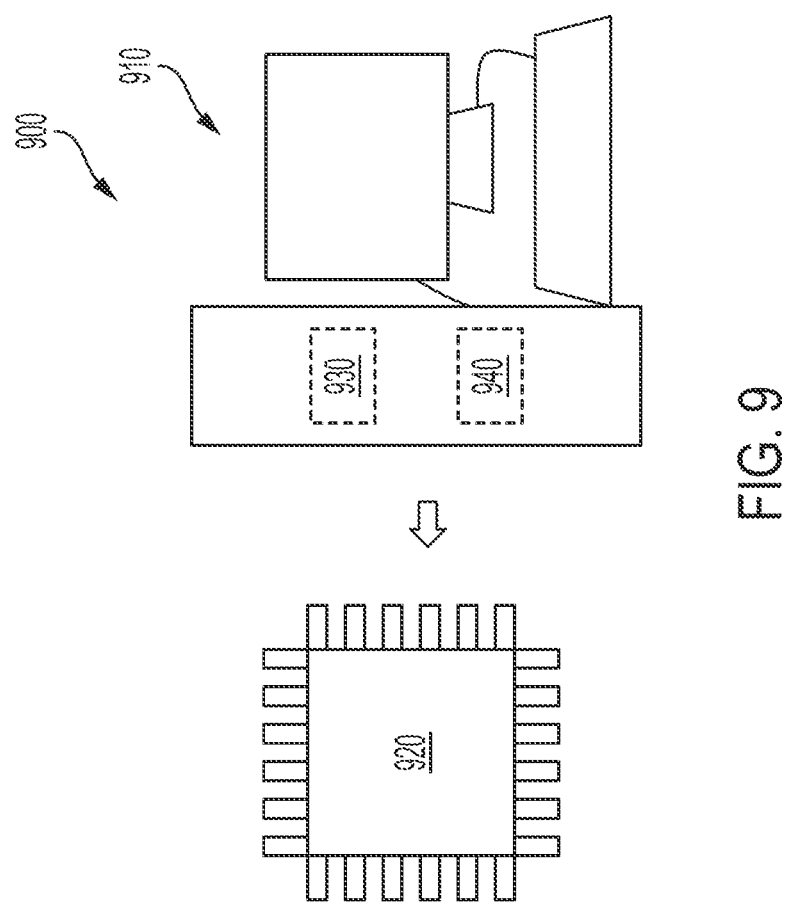
FIG. 9 depicts another block diagram of a system 900 to perform selective exposure of standard cell output nets for improved routing solutions according to embodiments of the invention

FIG. 9 is a block diagram of a system 900 to perform selective exposure of standard cell output nets for improved routing solutions according to embodiments of the invention. The system 900 includes processing circuitry 910 used to generate the design that is ultimately fabricated into an integrated circuit 920. The steps involved in the fabrication of the integrated circuit 920 are well-known and briefly described herein. Once the physical layout is finalized, based, in part, on obtained abstraction according to embodiments of the invention to facilitate optimization of the routing plan, the finalized physical layout is provided to a foundry. Masks are generated for each layer of the integrated circuit based on the finalized physical layout. Then, the wafer is processed in the sequence of the mask order. The processing includes photolithography and etch. This is further discussed with reference to FIG. 10.

Figure 10:
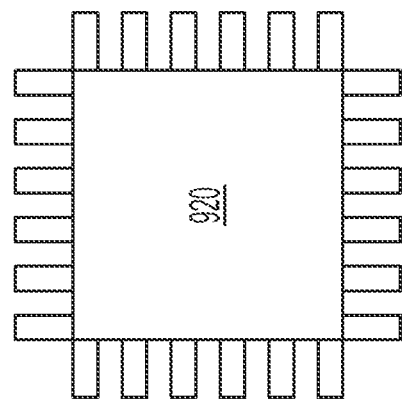
FIG. 10 depicts a process flow of a method of fabricating the integrated circuit according to exemplary embodiments of the invention.
Figure 10:
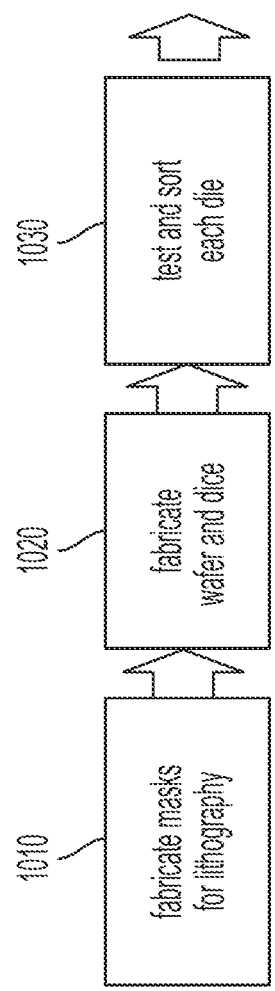

FIG. 10 is a process flow of a method of fabricating the integrated circuit according to exemplary embodiments of the invention. Once the physical design data is obtained, based, in part, on [reference invention], the integrated circuit 920 can be fabricated according to known processes that are generally described with reference to FIG. 10. Generally, a wafer with multiple copies of the final design is fabricated and cut (i.e., diced) such that each die is one copy of the integrated circuit 920. At block 1010, the processes include fabricating masks for lithography based on the finalized physical layout. At block 1020, fabricating the wafer includes using the masks to perform photolithography and etching. Once the wafer is diced, testing and sorting each die is performed, at block 1030, to filter out any faulty die.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for routing standard cells of an integrated circuit, the computer-implemented method comprising:
    obtaining a layout of a plurality of standard cells for routing;
    determining existing output connections for each of the plurality of standard cells;
    generating a representation for the layout removing the existing output connections for each of the plurality of standard cells; and
    providing the representation of the layout to an autorouter.

2. The computer-implemented method of claim 1, further comprising providing an abstraction of the integrated circuit by providing a disjointed representation the plurality of standard cells.

3. The computer-implemented method of claim 2, wherein the disjointed representation is provided while the standard cells remain fully routed.

4. The computer-implemented method of claim 2, wherein the abstraction allows the autorouter to use all of an available horizontal wiring resource of the layout.

5. The computer-implemented method of claim 1, wherein identical standard cells are adjacent to each other.

6. The computer-implemented method of claim 5, wherein adjacent standard cells are on a same metal layer.

7. The computer-implemented method of claim 5, wherein the identical standard cells are fully routed on a first metal layer.

8. A system for routing standard cells of an integrated circuit, the system comprising:
    a memory having computer readable instructions;
    one or more processors for executing the computer readable instructions, the computer readable instructions controlling the one or more processors to perform operations comprising:
        obtaining a layout of a plurality of standard cells for routing;
        determining existing output connections for each of the plurality of standard cells;
        generating a representation for the layout removing the existing output connections for each of the plurality of standard cells; and
        providing the representation of the layout to an autorouter.

9. The system of claim 8, further comprising providing an abstraction of the integrated circuit by providing a disjointed representation the plurality of standard cells.

10. The system of claim 9, wherein the disjointed representation is provided while the standard cells remain fully routed.

11. The system of claim 9, wherein the abstraction allows the autorouter to use all of an available horizontal wiring resource of the layout.

12. The system of claim 8, wherein identical standard cells are adjacent to each other.

13. The system of claim 12, wherein adjacent standard cells are on a same metal layer.

14. The system of claim 12, wherein the identical standard cells are fully routed on a first metal layer.

15. A computer program product comprising a computer-readable storage medium having program instructions embodied therewith, the program instructions executable by one or more processors to cause the one or more processors to perform operations comprising
    obtaining a layout of a plurality of standard cells for routing;
    determining existing output connections for each of the plurality of standard cells;
    generating a representation for the layout removing the existing output connections for each of the plurality of standard cells; and
    providing the representation of the layout to an autorouter.

16. The computer program product of claim 15, further comprising providing an abstraction of the integrated circuit by providing a disjointed representation the plurality of standard cells.

17. The computer program product of claim 16, wherein the disjointed representation is provided while the standard cells remain fully routed.

18. The computer program product of claim 16, wherein the abstraction allows the autorouter to use all of an available horizontal wiring resource of the layout.

19. The computer program product of claim 15, wherein identical standard cells are adjacent to each other.

20. The computer program product of claim 19, wherein adjacent standard cells are on a same metal layer.

* * * * *